United States Patent
Kim et al.

(10) Patent No.: US 10,700,329 B2
(45) Date of Patent: Jun. 30, 2020

(54) SEPARATOR HAVING HAVING HIGH TENSILE STRENGTH, MANUFACTURING METHOD THEREFOR, AND SECONDARY BATTERY INCLUDING SAME

(71) Applicant: SAMSUNG SDI CO., LTD., Yongin-si, Gyeonggi-do (KR)

(72) Inventors: Kee Wook Kim, Suwon-si (KR); Sang Ho Lee, Suwon-si (KR); Jung Seong Lee, Suwon-si (KR); Jun Ho Chung, Suwon-si (KR); Jae Hyun Cho, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 1182 days.

(21) Appl. No.: 14/771,378

(22) PCT Filed: Feb. 28, 2014

(86) PCT No.: PCT/KR2014/001707
§ 371 (c)(1),
(2) Date: Aug. 28, 2015

(87) PCT Pub. No.: WO2014/133371
PCT Pub. Date: Sep. 4, 2014

(65) Prior Publication Data
US 2016/0006009 A1    Jan. 7, 2016

(30) Foreign Application Priority Data
Feb. 28, 2013   (KR) .................. 10-2013-0021812

(51) Int. Cl.
*H01M 2/16*    (2006.01)
*H01M 2/14*    (2006.01)
*C08J 5/18*    (2006.01)
*B29C 55/14*   (2006.01)
*B29K 23/00*   (2006.01)
*B29L 7/00*    (2006.01)
*B29L 31/34*   (2006.01)

(52) U.S. Cl.
CPC ........... *H01M 2/1653* (2013.01); *B29C 55/14* (2013.01); *C08J 5/18* (2013.01); *H01M 2/145* (2013.01); *B29K 2023/065* (2013.01); *B29K 2995/0017* (2013.01); *B29K 2995/0065* (2013.01); *B29L 2007/008* (2013.01); *B29L 2031/3468* (2013.01)

(58) Field of Classification Search
CPC ..... H01M 2/145; H01M 2/1653; B29C 55/14; B29K 2023/065; B29K 2995/0017; B29K 2995/0065; B29L 2007/008; B29L 2031/3468
See application file for complete search history.

(56) References Cited

U.S. PATENT DOCUMENTS

| | | | | |
|---|---|---|---|---|
| 6,048,607 A * | 4/2000 | Hashimoto | ......... | B29C 47/0026 210/500.27 |
| 2003/0054237 A1* | 3/2003 | Zucker | ................ | H01M 2/1666 429/145 |
| 2007/0218271 A1* | 9/2007 | Lee | ............................ | C08J 5/18 428/304.4 |
| 2009/0117454 A1* | 5/2009 | Takita | ..................... | B01D 69/02 429/145 |
| 2009/0226814 A1* | 9/2009 | Takita | ................ | B01D 67/0027 429/247 |
| 2010/0151310 A1* | 6/2010 | Takita | ................ | B01D 67/0074 429/145 |
| 2013/0171499 A1* | 7/2013 | Yang | ..................... | H01M 2/162 429/145 |

FOREIGN PATENT DOCUMENTS

| JP | 08-034873 A | 2/1996 |
|---|---|---|
| JP | 2004-083866 A | 3/2004 |
| JP | 2009-234075 A | 10/2009 |
| KR | 10-2007-0114284 A | 11/2007 |
| KR | 10-2012-0063876 A | 6/2012 |

* cited by examiner

*Primary Examiner* — Adam A Arciero
(74) *Attorney, Agent, or Firm* — Lee IP Law, PC

(57) ABSTRACT

The present invention relates to a method for manufacturing a separator for batteries, a separator manufactured by the method, and a secondary battery including the separator. More specifically, the present invention relates to a method for manufacturing a separator having enhanced tensile strength by performing a shutdown process stopping a stretch during a process of stretching a base film of the separator.

9 Claims, No Drawings

SEPARATOR HAVING HAVING HIGH TENSILE STRENGTH, MANUFACTURING METHOD THEREFOR, AND SECONDARY BATTERY INCLUDING SAME

CROSS REFERENCE TO RELATED APPLICATIONS

This is the U.S. national phase application based on PCT Application No. PCT/KR2014/001707, filed Feb. 28, 2014, which is based on Korean Patent Application No. 10-2013-0021812, filed Feb. 28, 2013, the entire contents of all of which are hereby incorporated by reference.

TECHNICAL FIELD

The present invention relates to a method for manufacturing a separator having high tensile strength, a separator manufactured by the method, and a secondary battery including the same.

BACKGROUND ART

A separator for electrochemical batteries refers to an intermediate membrane that isolates a cathode and an anode from each other in a battery while maintaining ionic conductivity, thereby enabling charge/discharge of the battery.

Recently, along with a trend of pursuing light weight and miniaturization of electrochemical batteries to improve portability of electronic equipment, there is a need for high-power, high-capacity batteries for electric vehicles. Thus, a separator for batteries is required to have reduced thickness and weight as well as excellent dimensional stability under heat and high tension so as to improve productivity of high-capacity batteries.

In addition, recently, not only general properties such as permeability and thermal shrinkage resistance, but also properties influencing lifespan of batteries such as cycle characteristics, or properties influencing productivity of batteries such as electrolyte injection capabilities are also taken into account as important factors in manufacture of separators.

Among various processes in manufacture of batteries, since a winding process requires a substantial period of time and is closely associated with productivity of batteries, winding is performed at a high rate in order to increase production speed. Thus, in order to prevent process failure due to breakage of separators upon winding at a high rate, there is a need for studies on increase in tensile strength of separators.

As one example of techniques for manufacture of separators in the related art, Japanese Patent Publication No. 2004-083866 discloses a method for manufacturing a polyolefin porous membrane through simultaneous biaxial stretching of an ultrahigh molecular weight polyethylene film twice at different temperatures. However, this method is focused on improvement of air permeability and thermal shrinkage through adjustment of fine pores of the film, and is far from a technique capable of achieving increase in tensile strength of separators, particularly, improvement in productivity of separators.

DISCLOSURE

Technical Problem

It is an aspect of the present invention to provide a separator manufacturing method, which further includes a stopping process during a stretching process to manufacture a separator having improved tensile strength both in the machine direction (MD) and in the transverse direction (TD) thereof in order to facilitate high rate winding of the separator without breakage of the separator during winding.

It is another aspect of the present invention to provide a separator having improved tensile strength by changing a manufacturing process instead of changing components of the separator.

It is a further aspect of the present invention to provide a separator that exhibits excellent properties in terms of winding processability and thermal stability by increasing tensile strength of the separator while maintaining low thermal shrinkage thereof.

Technical Solution

Embodiments of the present invention provide a method for manufacturing a separator, which includes a stopping process to stop stretching during a process of stretching a base film in order to increase tensile strength of a separator.

Specifically, in accordance with one aspect of the present invention, a method for manufacturing a separator includes: stretching a polyolefin base film in the machine direction and/or in the transverse direction, and temporarily stopping stretching of the polyolefin base film at least once.

In accordance with another aspect of the present invention, a separator includes a polyethylene-containing base film, and has a tensile strength of 1,900 kgf/cm² or more both in the machine direction and in the transverse direction and a thermal shrinkage of 1% or less both in the machine direction and in the transverse direction, as measured after being left at 105° C. for 1 hour.

Advantageous Effects

Embodiments of the present invention provide a separator manufacturing method that includes a stopping process during a process of stretching a base film for a separator to increase tensile strength of the separator, thereby preventing breakage or deformation of the separator during winding of the separator at a high rate while improving puncture strength of the separator.

In addition, embodiments of the present invention provide a separator having excellent thermal stability by maintaining low thermal shrinkage of the separator while increasing tensile strength of the separator, and a secondary battery including the same.

BEST MODE

Hereinafter, embodiments of the present invention will be described in more detail. A description of details apparent to those skilled in the art will be omitted.

One aspect of the present invention relates to a method for manufacturing a separator, which includes stopping stretching of a base film of the separator during a process of stretching the base film in order to increase tensile strength of the separator.

Specifically, in accordance with one aspect of the present invention, the method for manufacturing a separator includes: stretching a polyolefin base film in the machine direction and/or in the transverse direction, and temporarily stopping stretching of the polyolefin base film at least once during stretching. The polyolefin base film may be, for example, a polyethylene-containing base film.

A polyolefin base film used in a separator for batteries may include a porous base film including fine pores therein. A method of producing the porous base film from a polyolefin can be generally classified into a dry process and a wet process.

The dry process refers to a process of preparing a polyolefin film, followed by stretching the polyolefin film at low temperature such that fine cracks are generated between lamellae corresponding to crystals of the polyolefin to form fine pores, or a process of preparing a film by mixing a polyolefin resin with inorganic particles, followed by stretching the film at low temperature such that fine cracks are generated between the polyolefin resin and the inorganic particles to form fine pores.

The wet process refers to a process of kneading a polyolefin resin and a diluent (an organic material having a low molecular weight and a similar molecular structure to a polyolefin) at a melting temperature of a polyolefin resin composition to form a single phase, cooling the mixture to separate the polyolefin and the diluent from each other, and extracting the diluent from the polyolefin film to form pores.

According to one aspect of the present invention, although formation of fine pores in the polyolefin base film may be realized by any typical method known in the art, the wet process may be used by way of example. The wet process can provide a porous film, which has a thinner and more uniform thickness, includes pores having a more uniform size, and exhibits better mechanical strength than the porous film manufactured by the dry process.

In the separator manufacturing method according to one aspect of the present invention based on the wet process, the process of stretching the polyolefin base film may be performed before or after extraction of the diluent, for example, before extraction of the diluent. When the stretching process is performed before extraction of the diluent, the polyolefin is softened by the diluent to allow easier stretching of the polyolefin base film, thereby improving production stability. In addition, the thickness of the film is reduced by stretching, thereby allowing easier removal of the diluent from the film in the course of diluent extraction.

According to one aspect of the present invention, stretching may include stretching the polyolefin base film in the machine direction (MD) and/or in the transverse direction (TD). As used herein, stretching in the machine direction (MD) and/or in the transverse direction (TD) may include uniaxial stretching in which the film is stretched in one of the machine direction and the transverse direction, simultaneous biaxial stretching in which the film is stretched at the same time in the machine direction and the transverse direction, and sequential biaxial stretching in which the film is first stretched in the machine direction (or in the transverse direction) and then stretched in the transverse direction (or in the machine direction).

According to one aspect of the present invention, stretching may be specifically performed by biaxial stretching, more specifically sequential biaxial stretching. Sequential biaxial stretching can reduce a difference in elongation between a gripped region and a non-gripped region by a sheet gripping device to secure uniform quality of final products and can prevent separation of a sheet from the sheet gripping device to secure production stability.

According to one aspect of the present invention, the polyolefin base film is formed by extrusion of a polyolefin resin composition. Here, the polyolefin resin composition may be composed of at least one type of polyolefin resin alone, or a mixture of at least one type of polyolefin resin, other resins excluding the polyolefin resin and/or inorganic materials.

Examples of the polyolefin resin applicable to the polyolefin base film according to the present invention may include polyethylene, polypropylene, poly-4-methyl-1-pentene, and the like. These may be used alone or in combination thereof. That is, the polyolefin resin may be used alone, or a copolymer or mixture thereof may be used.

The polyolefin base film may contain, for example, polyethylene. In one embodiment, the polyethylene may include polyethylene having a weight average molecular weight of 200,000 g/mol or more, more specifically high-density polyethylene (HDPE) having a weight average molecular weight of 500,000 g/mol or more. Specifically, the polyolefin base film may be high density polyethylene having a weight average molecular weight of 500,000 g/mol to 1,000,000 g/mol. The high density polyethylene may have a density of 0.9 g/cc to 1.0 g/cc. Such high density polyethylene can improve strength of the separator.

Examples of the other resins applicable to the polyolefin base film according to the present invention excluding the polyolefin resin may include polyamide resins, polybutylene terephthalate (PBT), polyethylene terephthalate (PET), polychlorotrifluoroethylene (PCTFE), polyoxymethylene (POM), polyvinyl fluoride (PVF), polyvinylidene fluoride (PVdF), polycarbonate, polyarylate, polysulfone, polyether imide, and the like. These may be used alone or in combination thereof.

Examples of the inorganic materials applicable to the polyolefin base film according to the present invention may include calcium carbonate, silica, barium sulfate, talc, and the like. These may be used alone or in combination thereof.

When the separator is manufactured by the wet process, a sheet-shaped polyolefin base film may be formed by extrusion of the polyolefin and the diluent at the same time, as described above.

According to one aspect of the present invention, the diluent is not particularly limited and may be any organic compound capable of forming a single phase with the polyolefin resin (or with the mixture of the polyolefin resin and the resin other than the polyolefin resin) at an extrusion temperature.

Examples of the diluent may include aliphatic or cyclic hydrocarbons such as nonane, decane, decalin, liquid paraffin (or paraffin oil), and paraffin wax; phthalate esters such as dibutyl phthalate, dioctyl phthalate; $C_{10}$ to $C_{20}$ fatty acids such as palmitic acid, stearic acid, oleic acid, linoleic acid, and linolenic acid; and $C_{10}$ to $C_{20}$ fatty alcohols such as palmitic alcohol, stearic alcohol, and oleic alcohol, without being limited thereto. These compounds may be used alone or in combination thereof.

For example, the diluent may be liquid paraffin. Since liquid paraffin is harmless to humans, has a high boiling point, and has a low volatile content, the liquid paraffin is suitable for use as a diluent in the wet process.

As used herein, the term "temporary stopping" means a process of stopping the process of stretching the polyolefin base film or a process of decreasing the stretching speed, and may vary depending upon a separator manufacturing process.

The separator manufacturing process can be generally classified into a continuous process and a non-continuous process. The continuous process refers to a process of continuously stretching a film sheet in the machine direction using a roll and stretching the film sheet using a tenter type sheet gripping device in the transverse direction, and the non-continuous process refers to a process of cutting a film sheet cut into a predetermined size, gripping the cut film sheet using tenters in the machine direction and the transverse direction, and stretching the film sheet in each of the directions.

When the separator manufacturing process is a continuous process, temporary stopping may be realized by reducing a rotating speed of the roller in the process of stretching the polyolefin base film. Here, the rotating speed of the roller may be reduced to 60% or less the rotating speed of the roller before temporary stopping. Specifically, the rotating speed of the roller may be reduced to 50% or less, for example, 40% or less, for example, 30% or less, for example, 20% or less the rotating speed of the roller before temporary stopping. When the separator manufacturing process is a non-continuous process, temporary stopping may be realized by temporarily stopping stretching of the film during the process of stretching the film. In the non-continuous process, stopping of film stretching may be realized by simultaneously or sequentially stopping stretching of the film in four directions including upward, downward, rightward and leftward directions. Sequential stopping of film stretching may include temporary stopping of film stretching during stretching of the film in the machine direction, temporary stopping of film stretching during stretching of the film in the transverse direction, or temporary stopping of film stretching during primary stretching of the film in the machine direction and primary stretching of the film in the transverse direction.

In the process of stretching the polyolefin base film, as a polymer chain is stretched in the stretching direction, higher force is applied to the film with increasing stretching factor of the film and significantly influences tensile strength of the separator. During such a stretching process, temporary stopping of film stretching or decrease of the stretching speed allows the polymer chain to be loosened and stabilized, thereby reducing force applied to the film. Then, when stretching is resumed while the film is stabilized, the force applied to the tenters is rapidly increased, whereby the force applied to the film is also increased. The present invention provides a separator having good tensile strength by adjusting the stretching process and the process of stopping the stretching process.

Temporary stopping may be performed after performing the process of stretching the base film until the base film is stretched to 40% or more a final stretching factor. For example, temporary stopping may be performed after performing the process of stretching the base film until the base film is stretched to 50% or more the final stretching factor. For example, temporary stopping may be performed after performing the process of stretching the base film until the base film is stretched to 80% or more the final stretching factor. Within this range, it is possible to achieve sufficient increase in tensile strength of the polyolefin base film and suitable adjustment of elongation of a final base film by resuming the stretching process after temporary stopping of the stretching process.

In accordance with another aspect of the invention, stretching in the machine direction and/or stretching in the transverse direction may include a series of stretching in the machine direction and stretching in the transverse direction several times, and temporary stopping may be performed at least once during the series of stretching in the machine direction and stretching in the transverse direction several times. For example, the series of stretching in the machine direction and stretching in the transverse direction may be performed once to five times, or once to four times, or once to three times. For example, when the series of stretching in the machine direction and stretching in the transverse direction is performed three times, temporary stopping may be performed between a series of primary stretching in the machine direction and primary stretching in the transverse direction and a series of secondary stretching in the machine direction and secondary stretching in the transverse direction; and/or between the series of secondary stretching in the machine direction and secondary stretching in the transverse direction and a series of tertiary stretching in the machine direction and tertiary stretching in the transverse direction.

Temporary stopping may be performed, for example, for 3 to 60 seconds, more specifically 3 to 30 seconds per once stopping. Within this range, the stretching process can be sufficiently stopped to reduce the force applied to the film, whereby the force applied to the film can be efficiently increased upon resuming the stretching process.

In one embodiment of the invention, when the base film is stretched to less than 5×5 times in the machine direction and in the transverse direction, temporary stopping may be performed for less than 10 seconds, and in another embodiment of the invention, when the base film is stretched to than 5×5 times or more in the machine direction and in the transverse direction, temporary stopping may be performed for 10 seconds or more.

The separator manufacturing method according to the present invention based on the wet process may further include a process of extracting the diluent from the polyolefin film.

Any organic solvent may be used in the process of extracting the diluent so long at the organic solvent can extract the diluent used in extrusion of the polyolefin resin. Examples of the organic solvent may include methylethylketone, methylene chloride, hexane, and the like, all of which have high extraction efficiency and can be easily dried.

The separator manufacturing method according to the present invention may further include heat fixing the film. Specifically, heat fixing includes stretching the film to a stretching factor of 1 or 2 times an initial length of the film in the transverse direction and relaxing the stretched film to an elongation of 80% to 100% the stretched length of the film in the transverse direction. Heat fixing may be performed at 100° C. to 150° C., for example, at 120° C. to 140° C., for about 5 to about 120 seconds. Within this range, heat fixing is effective in removal of residual stress from the film and can enhance properties of the film. That is, thermal shrinkage and air permeability of the film may be adjusted depending upon the temperature and the fixing ratio upon heat fixing.

The separator manufactured by the method according to the present invention may satisfy the following properties:

a) The separator has a tensile strength of 1,900 kgf/cm$^2$ or more both in the machine direction and in the transverse direction;

b) The separator has higher tensile strength in the machine direction than in the transverse direction;

c) The separator has a thermal shrinkage of 1% or less both in the machine direction and in the transverse direction as measured after being left at 105° C. for 1 hour; and d) The separator has a puncture strength per unit thickness of 40 gf/μm or more.

In accordance with a further aspect of the invention, a separator includes a polyethylene-containing base film, and has a tensile strength of 1,900 kgf/cm$^2$ or more both in the machine direction and in the transverse direction, higher tensile strength in the machine direction than in the transverse direction, and a thermal shrinkage of 1% or less both in the machine direction and in the transverse direction as measured after being left at 105° C. for 1 hour. In addition, the separator has a tensile strength of 2,000 kgf/cm² or more in the machine direction. More specifically, the separator has a tensile strength of 2,100 kgf/cm² or more in the machine direction and a tensile strength of 1,910 kgf/cm² or more in the transverse direction. The tensile strength of the separator in the machine direction may be greater than the tensile strength thereof in the transverse direction by 100 kgf/cm² or more, or 200 kgf/cm² or more.

Tensile strength of the separator may be measured by any method typically used in the art. By way of example, the tensile strength of the separator may be measured by the following method. The manufactured separator is cut into a rectangular shape having a size of 10 mm×50 mm (length (MD)×width (TD)) at 10 different regions, thereby obtaining 10 specimens. Then, each of the specimens is mounted on a universal testing machine (UTM, tensile tester), gripped to have length of 20 mm, followed by measurement of average tensile strength in the machine direction and the transverse direction while applying pulling force to the specimen.

Thermal shrinkage of the separator may be measured by any typical method used in the art. By way of example, the thermal shrinkage of the separator may be measured by the following method. The manufactured separator is cut into a size of 50 mm×50 mm (length (MD)×width (TD)) at 10 different regions to obtain 10 specimens. Then, each of the specimens is left in an oven at 105° C. for 1 hour and thermal shrinkage of each specimen in the MD direction and in the TD direction is measured, followed by calculating average thermal shrinkage.

In accordance with yet another aspect of the present invention, there is provided a separator having a puncture strength of 40 gf/μm or more.

The puncture strength of the separator may be measured by any method typically used in the art. By way of example, the puncture strength of the separator may be measured by the following method. The manufactured separator is cut into a size of 50 mm×50 mm (length (MD)×width (TD)) at 10 different regions to obtain 10 specimens. Then, each of the specimens is placed over a hole having a diameter of 10 cm on a tester G5 (Gato Tech. Co., Ltd), followed by measuring puncturing force three times for each specimen while pressing down using a probe having a diameter of 1 mm and then averaging the obtained puncturing force values.

In accordance with yet another aspect of the present invention, there is provided an electrochemical battery which includes a polyolefin porous separator prepared using the method as set forth above, a cathode, and an anode and is filled with an electrolyte.

The electrochemical battery is not particularly limited in terms of kind thereof and may be any typical battery known in the art.

The electrochemical battery may be a lithium secondary battery, such as a lithium metal secondary battery, a lithium ion secondary battery, a lithium polymer secondary battery, or a lithium ion polymer secondary battery.

The electrochemical battery according to the present invention may be manufactured by any method typically used in the art.

By way of example, the electrochemical battery may be manufactured by the following method. The polyolefin separator according to the present invention is disposed between a cathode and an anode, followed by filling the battery with an electrolyte, thereby providing an electrochemical battery Electrodes constituting the electrochemical battery according to the present invention may be prepared in the form of an electrode current collector with an electrode active material applied thereto using a typical method known in the art.

Among the electrode active materials used in the present invention, a cathode active material may be any cathode active material typically used in the art.

Examples of the cathode active material may include lithium manganese oxide, lithium cobalt oxide, lithium nickel oxide, lithium iron oxide, and lithium complex oxides obtained by combination thereof, without being limited thereto.

Among the electrode active materials according to the present invention, an anode active material may be any anode active material typically used in the art.

Examples of the anode active material may include lithium adsorption materials, such as a lithium metal or lithium alloy, carbon, petroleum coke, activated carbon, graphite, and other carbons, without being limited thereto.

The electrode current collectors may be any electrode current collector typically used in the art.

Examples of materials for a cathode current collector of the electrode current collectors may include a foil made of aluminum, nickel, and combinations thereof, without being limited thereto.

Examples of materials for an anode current collector of the electrode current collectors may include a foil made of copper, gold, nickel, copper alloys, and combinations thereof, without being limited thereto.

The electrolyte may be any electrolyte for electrochemical batteries typically used in the art.

The electrolyte may be an electrolyte obtained by dissolution or dissociation of a salt having a structure such as $A^+B^-$ in an organic solvent.

Examples of $A^+$ may include, but are not limited to, an alkali metal cation such as $Li^+$, $Na^+$, or $K^+$ and a cation obtained by combination thereof.

Examples of $B^-$ may include, but are not limited to, an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, or $C(CF_2SO_2)_3^-$ and an anion obtained by combination thereof.

Examples of the organic solvent may include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), and γ-butyrolactone (GBL), without being limited thereto. These organic solvents may be used alone or as mixtures thereof.

Next, the present invention will be described in more detail with reference to examples, comparative examples, and experimental examples. However, it should be noted that these examples, comparative examples, and experimental examples are provided for illustration only and should not be construed in any way as limiting the invention.

Example 1

30 parts by weight of a high-density polyethylene having a weight average molecular weight of 600,000 g/mol (HDPE; Mitsui Chemical) (density: 0.95 g/cc) and 70 parts by weight of liquid paraffin (Kukdong Oil & Chemicals Co., Ltd.) as a plasticizer were introduced into a twin-screw extruder, followed by extrusion.

After extrusion, a gel phase obtained through a die was formed into a sheet using a cooling roll, and then the sheet was cut into a specimen having a size of 90 mm×90 mm (length×width). Before extraction of the liquid paraffin from the sheet, the sheet was stretched by a sequential biaxial stretching method in a batch stretching machine. Here, the sheet was subjected to primary stretching to a stretching factor of 3×3 times, primary stopping for 5 seconds, and secondary stretching to a stretching factor of 6×6 times.

Then, the stretched polyethylene base film was washed with methylene chloride (Samsung Fine Chemical Co., Ltd.) to extract the liquid paraffin therefrom, and dried, followed by heat fixing at a temperature of 125° C. to 130° C. for 30 seconds, thereby providing a finished separator.

Example 2

A separator was prepared in the same manner as in Example 1 except that polyethylene having a weight average molecular weight 300,000 g/mol was used instead of the high density polyethylene and primary stopping was carried out for 20 seconds.

Example 3

A separator was prepared in the same manner as in Example 1 except that polyethylene (300,000 g/mol) was used instead of the high density polyethylene and primary stopping was carried out for 5 seconds after primary stretching to a stretching factor of 5×5 times.

Example 4

A separator was prepared in the same manner as in Example 1 except that polyethylene (300,000 g/mol) was used instead of the high density polyethylene and primary stopping was carried out for 20 seconds after primary stretching to a stretching factor of 5×5 times.

Example 5

A separator was prepared in the same manner as in Example 1 except that polyethylene (300,000 g/mol) was used instead of the high density polyethylene and secondary stopping was carried out for 5 seconds between secondary stretching to a stretching factor of 5×5 times, and tertiary stretching to a stretching factor of 6×6 times.

Example 6

A separator was prepared in the same manner as in Example 1 except that polyethylene (300,000 g/mol) was used instead of the high density polyethylene and secondary stopping was carried out for 20 seconds between secondary stretching to a stretching factor of 5×5 times, and tertiary stretching to a stretching factor of 6×6 times.

Comparative Example 1

A separator was prepared in the same manner as in Example 1 except that polyethylene (300,000 g/mol) was used instead of the high density polyethylene, primary stretching was performed to a stretching factor of 6×6 times, and the sheet was subjected to continuous stretching without stopping the stretching process.

Experimental Example 1

Measurement of Tensile Strength

To measure tensile strength of each of the separators prepared in Examples 1 to 6 and Comparative Example 1, the following experiment was conducted.

Each of the separators prepared in Examples and Comparative Examples was cut into a rectangular shape having a size of 10 mm×50 mm (length (MD)×width (TD)) at 10 different regions to obtain 10 specimens. Then, each of the specimens was mounted on a universal testing machine (UTM, tensile tester) and gripped to have a length of 20 mm, followed by measurement of average tensile strength in the machine direction (MD) and the transverse direction (TD) while applying pulling force to the specimen.

Experimental Example 2

Measurement of Puncture Strength

To measure puncture strength of each of the separators prepared in Examples 1 to 6 and Comparative Example 1, the following experiment was conducted.

Each of the separators prepared in Examples and Comparative Examples was cut into a size of 50 mm×50 mm (length (MD)×width (TD)) at 10 different regions to obtain 10 specimens. Next, each of the specimens was placed over a hole having a diameter of 10 cm using a compression tester G5 (Gato Tech Co., Ltd), followed by measuring puncturing force three times for each specimen while pressing down using a probe having a diameter of 1 mm, and then averaging the obtained values.

Experimental Example 3

Measurement of Thermal Shrinkage

To measure thermal shrinkage of each of the separators prepared in Examples 1 to 6 and Comparative Example 1, the following experiment was conducted.

Each of the separators prepared in Examples and Comparative Examples was cut into a size of 50 mm×50 mm (length (MD)×width (TD)) at 10 different regions to obtain 10 specimens. Then, each of the specimens was left in an oven at 105° C. for 1 hour, followed by measuring the degree of shrinkage in the MD and in the TD, and then calculating average thermal shrinkage.

Table 1 shows conditions for stretching and stopping processes in manufacture of the separators of Examples 1 to 6 and Comparative Example 1, and measurement results in Experimental Examples 1 to 3.

TABLE 1

| | Material for separator | Stretching and stopping processes | | | | | Tensile strength (kgf/cm$^2$) | | Puncture strength per unit thickness (gf/μm) | Thermal shrinkage (%) | |
| --- | --- | --- | --- | --- | --- | --- | --- | --- | --- | --- | --- |
| | | Primary stretching factor | Primary stopping time | Secondary stretching factor | Secondary stopping time | Tertiary stretching factor | MD | TD | | MD | TD |
| Comparative Example 1 | PE | 6 × 6 | — | — | — | — | 1850 | 1570 | 37.5 | 5 | 6 |
| Example 1 | HDPE | 3 × 3 | 5 seconds | 6 × 6 | — | — | 2107 | 2023 | 40.8 | <1 | <1 |
| Example 2 | PE | 3 × 3 | 20 seconds | 6 × 6 | — | — | 2343 | 1987 | 41.3 | <1 | <1 |
| Example 3 | PE | 5 × 5 | 5 seconds | 6 × 6 | — | — | 2260 | 2040 | 42.5 | <1 | <1 |
| Example 4 | PE | 5 × 5 | 20 seconds | 6 × 6 | — | — | 2145 | 1940 | 47.3 | <1 | <1 |
| Example 5 | PE | 3 × 3 | 5 seconds | 5 × 5 | 5 seconds | 6 × 6 | 2054 | 2067 | 40.1 | <1 | <1 |
| Example 6 | PE | 3 × 3 | 5 seconds | 5 × 5 | 20 seconds | 6 × 6 | 2110 | 1917 | 40.2 | <1 | <1 |

The invention claimed is:

1. A method for manufacturing a separator, the method comprising:
   preparing a polyolefin base film that includes a plasticizer;
   stretching the polyolefin base film that includes the plasticizer in a machine direction and/or in a transverse direction;
   stopping stretching of the polyolefin base film that includes the plasticizer for a time period of 3 to 60 seconds at least once during stretching of the polyolefin base film that includes the plasticizer in the machine direction and/or in the transverse direction;
   resuming stretching of the polyolefin base film that includes the plasticizer at the end of the time period of 3 to 60 seconds; and
   after the resuming of the stretching of the polyolefin base film that includes the plasticizer, extracting the plasticizer from the polyolefin base film.

2. The method according to claim 1, wherein the stopping is performed after the base film is stretched to 40% or more of a final stretching factor of the base film.

3. The method according to claim 1, wherein the stopping is performed after the base film is stretched to 50% or more of the final stretching factor of the base film.

4. The method according to claim 1, wherein the stretching of the polyolefin base film that includes the plasticizer in the machine direction and/or in the transverse direction includes a series of stretching in the machine direction and stretching in the transverse direction, and stopping for the time period of 3 to 60 second and resuming stretching at the end of the time period of 3 to 60 seconds are performed at least once in the course of the series of stretching in the machine direction and in the course of stretching in the transverse direction.

5. The method according to claim 4, wherein the stopping for the time period of 3 to 60 seconds and resuming stretching at the end of the time period of 3 to 60 seconds are performed once to five times in the course of the series of stretching in the machine direction and stretching in the transverse direction.

6. The method according to claim 1, wherein, when the base film that includes the plasticizer is stretched to a stretching factor of less than 5×5 times in the machine direction and in the transverse direction, and the stopping is performed for a time period of 3 to 10 seconds.

7. The method according to claim 1, wherein, the base film that includes the plasticizer is stretched to a stretching factor of 5×5 times to 6×6 times in the machine direction and in the transverse direction, and the stopping is performed for a time period of 10 to 60 seconds.

8. A method, comprising:
   performing a first stretching of a polyolefin base film in a machine direction and/or in a transverse direction; and
   after performing the first stretching, reducing a stretching speed of the polyolefin base film in the machine direction and/or in the transverse direction for at most 60 seconds, the reducing of the stretching speed being performed for at least 3 seconds, and then resuming stretching to perform a second stretching of the polyolefin base film in the machine direction and/or in the transverse direction.

9. The method as claimed in claim 8, wherein the first and second stretchings include stretching the polyolefin base film using a rotating roller, and reducing the stretching speed includes reducing a rotation speed of the roller by about 20% to about 60% of a rotation speed used when in the first and second stretchings of the polyolefin base film.

* * * * *

UNITED STATES PATENT AND TRADEMARK OFFICE
CERTIFICATE OF CORRECTION

| | | |
|---|---|---|
| PATENT NO. | : 10,700,329 B2 | Page 1 of 1 |
| APPLICATION NO. | : 14/771378 | |
| DATED | : June 30, 2020 | |
| INVENTOR(S) | : Kee Wook Kim et al. | |

It is certified that error appears in the above-identified patent and that said Letters Patent is hereby corrected as shown below:

On the Title Page

Item (54) and in the Specification, Column 1, Lines 1-4, Please correct the title to read:
-- SEPARATOR HAVING HIGH TENSILE STRENGTH, MANUFACTURING METHOD THEREFOR, AND SECONDARY BATTERY INCLUDING SAME --

Signed and Sealed this
Twenty-fifth Day of August, 2020

Andrei Iancu
*Director of the United States Patent and Trademark Office*